No. 841,289. PATENTED JAN. 15, 1907.
W. T. WALTER.
COTTON CHOPPER.
APPLICATION FILED NOV. 15, 1906.
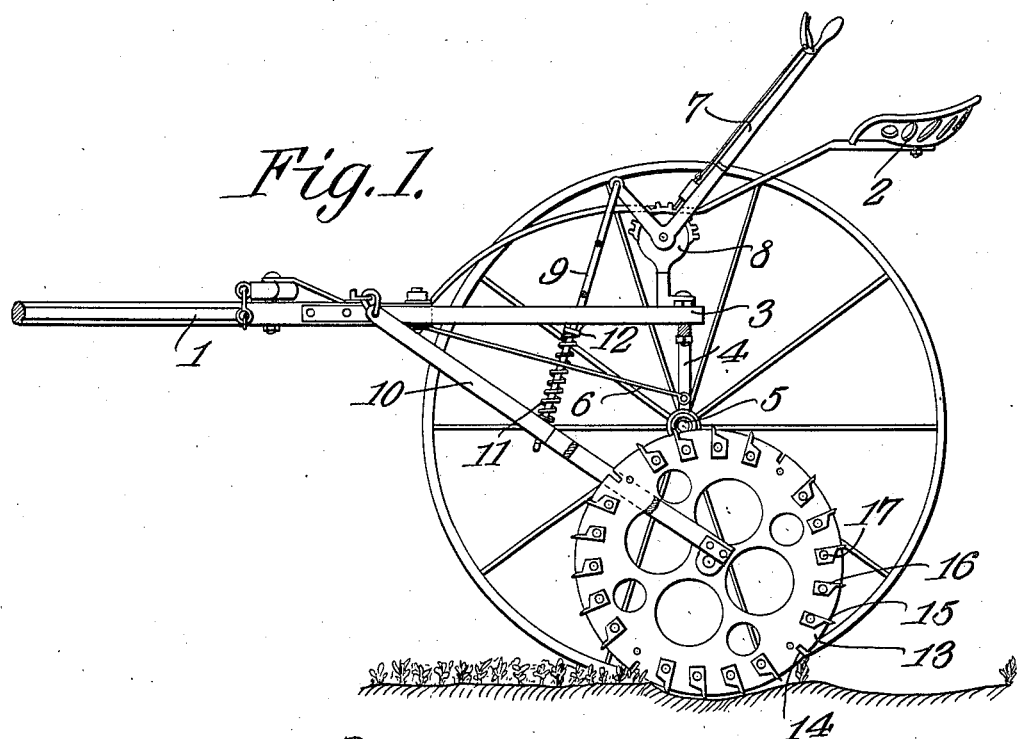
Fig. 1.
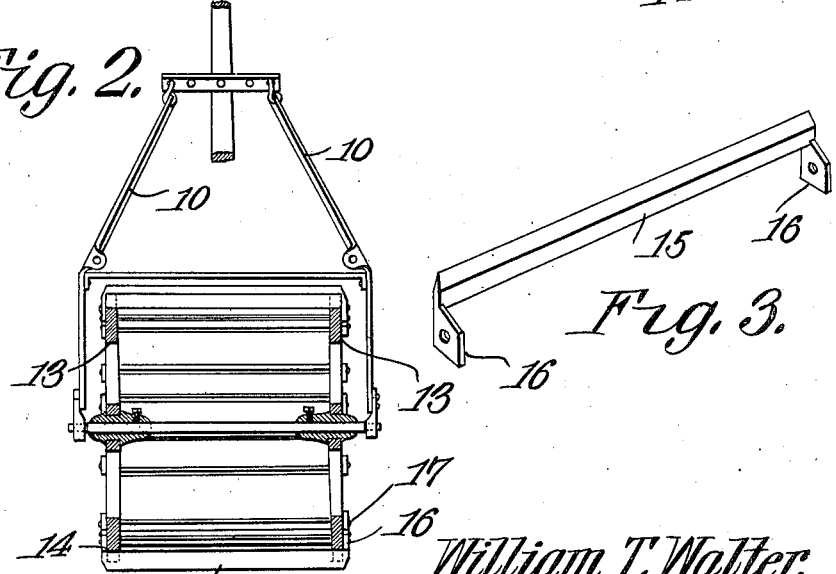
Fig. 2.
Fig. 3.
WITNESSES:
C. H. Stewart
C. Bradway
William T. Walter,
INVENTOR.
By C. A. Snow & Co.
ATTORNEYS

UNITED STATES PATENT OFFICE.

WILLIAM THOMAS WALTER, OF ANGLETON, TEXAS.

COTTON-CHOPPER.

No. 841,289.  Specification of Letters Patent.  Patented Jan. 15, 1907.

Application filed November 15, 1906. Serial No. 343,598.

*To all whom it may concern:*

Be it known that I, WILLIAM THOMAS WALTER, a citizen of the United States, residing at Angleton, in the county of Brazoria and State of Texas, have invented a new and useful Cotton-Chopper, of which the following is a specification.

This invention has relation to cotton-choppers; and it consists in the novel construction and arrangement of its parts, as hereinafter shown and described.

The object of the invention is to provide a chopper of the nature indicated which may be easily and readily adjusted for cutting out sections of the growing plants at desired intervals.

The chopper consists, primarily, of a wheel-mounted frame, to which is pivotally attached a chopper-frame, a ratchet-lever being located upon the wheel-mounted frame and being connected with the chopper-frame for raising and lowering the same. The chopper is of special construction and is journaled to the chopper-frame. It comprises a pair of disks provided at their peripheries with radially-extending recesses. The end portions of cutting-blades are located in said recesses, while the extremities of the said blades are twisted or bent at right angles to the intermediate portions thereof and are adapted to bear against the outer side of the said disks, to which sides the extremities of the blades are bolted. Thus a very substantial and rigid structure is produced as the extremities of the blades are attached directly to the outer surfaces of the disks and are seated in the peripheral recesses of the same. The structure also makes it possible for each individual cotton raiser to thin his cotton according to his own individual taste or the condition of the soil. This is done by removing one or more of the said blades at intervals, so that the spaces left thereby will escape the growing plants, while the remaining blades will destroy those that they come in contact with.

In the accompanying drawings, Figure 1 is a side elevation of the cotton-chopper with parts in section. Fig. 2 is a top plan view of the chopper-frame with the chopper in section, and Fig. 3 is a perspective view of one of the chopping-blades.

The frame of the chopper consists of the tongue 1, to the rear portion of which is attached the operator's seat 2. The side bars 3 3 are attached to the tongue 1 near the rear end of the same and are supported at their rear ends by the upright portions 4 4 of the axle 5. The brace-rods 6 are attached at their forward ends to the tongue 1 and at their rear ends to the upright portions 4 of the axle 5. The ratchet-lever 7 is fulcrumed to the gear-segment 8, and the rod 9 is connected at one end to the working end of the said lever 7 and at its other end to the cutter-frame 10. The coil-spring 11 is interposed between a guide 12, attached to the wheel-mounted frame of the chopper and the cutter-frame 10. Said spring is under tension, the tendency of which is to maintain the cutter-frame in the lowest possible position, and at the same time offers a resilient resistance to the upward movement of the last said frame and its attachments with relation to the wheel-mounted frame. The said lever 7 and its connections may be duplicated, as illustrated in the drawings, if desired. The cutter-frame 10 is pivoted at its forward end to the tongue 1, and the disks 13 are journaled at the lower end of the said cutter-frame 10. The said disks 13 are foraminous, and are thereby relieved of excessive and unnecessary weight. The peripheries of the disks 13 are provided with the radially-extending recesses 14. The cutting-blades 15 are seated at points in the vicinity of their ends in said recesses, and the extremities 16 of the said blades are twisted or bent at right angles to the longitudinal axis of the intermediate portions thereof and bear directly against the outer faces of the disks 13 and are secured thereto by means of the transversely-extending bolts 17.

As above indicated, a structure so assembled is very rigid and is capable of withstanding rough usage to which such an implement is subjected. By reason of the fact that the cutting-blades 15 are seated near their ends in the peripheral recesses 14 of the disks 13 the said disks are positively confined with relation to each other, so that they are caused to rotate in unison, and, furthermore, by positively attaching the extremities of the blades 16 to the outer faces of the disks 13 the said disks are confined against lateral movement or vibration with relation to each other.

As above indicated, each operator may remove as many blades 15 from the disks 13 as condition or fancy may indicate, and thus he may leave the growing plants at greater or less intervals, as he may deem to be to the best advantage in view of his soil conditions.

Having described my invention, what I claim as new, and desire to secure by Letters Patent, is—

A chopper comprising a wheel-mounted frame, a cutter-frame pivoted thereto, disks journaled to said cutter-frame and having at their peripheries radially-extending recesses, blades seated near their ends in said recesses and connecting the disks together, said blades having their extremities bent at right angles to their intermediate portions and means securing the blade extremities directly against the outer faces of the disks.

In testimony that I claim the foregoing as my own I have hereto affixed my signature in the presence of two witnesses.

WILLIAM THOMAS WALTER.

Witnesses:
J. T. LOGGINS,
FRANK W. STEVENS.